US008346115B2

(12) United States Patent
Hamaya

(10) Patent No.: US 8,346,115 B2
(45) Date of Patent: Jan. 1, 2013

(54) POWER SUPPLY CIRCUIT IDENTIFICATION DEVICE FOR IDENTIFYING A TYPE OF A POWER SUPPLY CIRCUIT AND IMAGE FORMING APPARATUS

(75) Inventor: Masahito Hamaya, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 306 days.

(21) Appl. No.: 12/695,460

(22) Filed: Jan. 28, 2010

(65) Prior Publication Data

US 2010/0196043 A1 Aug. 5, 2010

(30) Foreign Application Priority Data

Jan. 30, 2009 (JP) ................................ 2009-020563

(51) Int. Cl.
*G03G 15/00* (2006.01)
*H02H 3/26* (2006.01)

(52) U.S. Cl. ........................................... 399/88; 361/78

(58) Field of Classification Search .................... 399/38, 399/50, 66, 75, 88, 89; 307/38; 320/106; 361/78

See application file for complete search history.

(56) References Cited

U.S. PATENT DOCUMENTS

| | | | | |
|---|---|---|---|---|
| 5,420,496 | A * | 5/1995 | Ishikawa | 320/106 |
| 5,506,490 | A * | 4/1996 | DeMuro | 320/106 |
| 5,910,875 | A * | 6/1999 | Tian et al. | 361/78 |
| 7,239,042 | B2 * | 7/2007 | Yamanaka | 307/38 |

FOREIGN PATENT DOCUMENTS

| | | |
|---|---|---|
| JP | 04-015581 | 1/1992 |
| JP | 05-004653 | 1/1993 |
| JP | 09-215329 A | 8/1997 |
| JP | 11-122947 | 4/1999 |
| JP | 11-191090 A | 7/1999 |
| JP | 2002-153058 A | 5/2002 |
| JP | 2006-031222 | 2/2006 |

OTHER PUBLICATIONS

Notification of Reasons for Refusal dated Jan. 25, 2011 in Japanese Patent Application No. JP2009-020563 and English translation thereof.

* cited by examiner

*Primary Examiner* — Hoan Tran
(74) *Attorney, Agent, or Firm* — Banner & Witcoff, Ltd.

(57) ABSTRACT

A power supply circuit identification device for identifying a type of a power supply circuit, the power supply circuit having an input terminal to which a control signal for controlling electrical power supplied to an electrical load is input and an output terminal from which a detection signal that indicates whether the electrical power corresponding to the control signal is supplied to the electrical load is output, at least one of the input terminal and output terminal being plurally provided and having a type-dependent correlation between the input and output terminals. The identification device includes: a control section configured to input the control signal to the power supply circuit via the input terminal; a reading section configured to read the detection signal from the output terminal; and an identification section configured to identify a type of the power supply circuit based on a reading result from the reading section.

15 Claims, 10 Drawing Sheets

POWER SUPPLY CIRCUIT IDENTIFICATION DEVICE FOR IDENTIFYING A TYPE OF A POWER SUPPLY CIRCUIT AND IMAGE FORMING APPARATUS

CROSS REFERENCE TO RELATED APPLICATION

This application claims priority from Japanese Patent Application No. 2009-20563 filed Jan. 30, 2009. The entire content of this priority application is incorporated herein by reference.

TECHNICAL FIELD

The present disclosure relates to a power supply circuit identification device for identifying a type of a power supply circuit that supplies electrical power to an electrical load.

BACKGROUND

There have been a plurality of a type of a power supply circuit to be mounted in an electric equipment body such as an image forming apparatus, and such as, for example, a control parameter for controlling each power supply circuit is different depending on its type. The type therefore needs to be identified in the side of the electric equipment body. Considering the foregoing, there has conventionally been the electric equipment which is constituted in such a manner that an output from the power supply circuit is in a high or a low level state in accordance with the type, and on the other hand, the body of the electric equipment comprises a type identification port to which electric equipments of each type are connected and a main substrate, wherein the main substrate is constituted so as to conduct mode identification on the basis of the high and low state of the type identification port.

However, according to the conventional electric equipment, it has been necessary to separately provide a port for the type identification for power supply circuit.

SUMMARY

A power supply circuit identification device for identifying a type of a power supply circuit according to an aspect of the present invention supplies electrical power to an electrical load. The power supply circuit has an input terminal to which a control signal for controlling the electrical power supplied to the electrical load is input and an output terminal from which a detection signal that indicates whether the electrical power corresponding to the control signal input from the input terminal is supplied to the electrical load is output, at least one of the input terminal and output terminal being plurally provided and has a type-dependent correlation between the input and output terminals. The power supply circuit identification device includes a control section, a reading section and an identification section. The control section is configured to input the control signal to the power supply circuit via the input terminal. The reading section is configured to read the detection signal from the output terminal. The identification section is configured to identify a type of the power supply circuit based on a reading result from the reading section.

BRIEF DESCRIPTION OF THE DRAWINGS

Illustrative aspects in accordance with the invention will be described in detail with reference to the following figures wherein.

DETAILED DESCRIPTION

<Illustrative Aspect 1>

Figure 1:
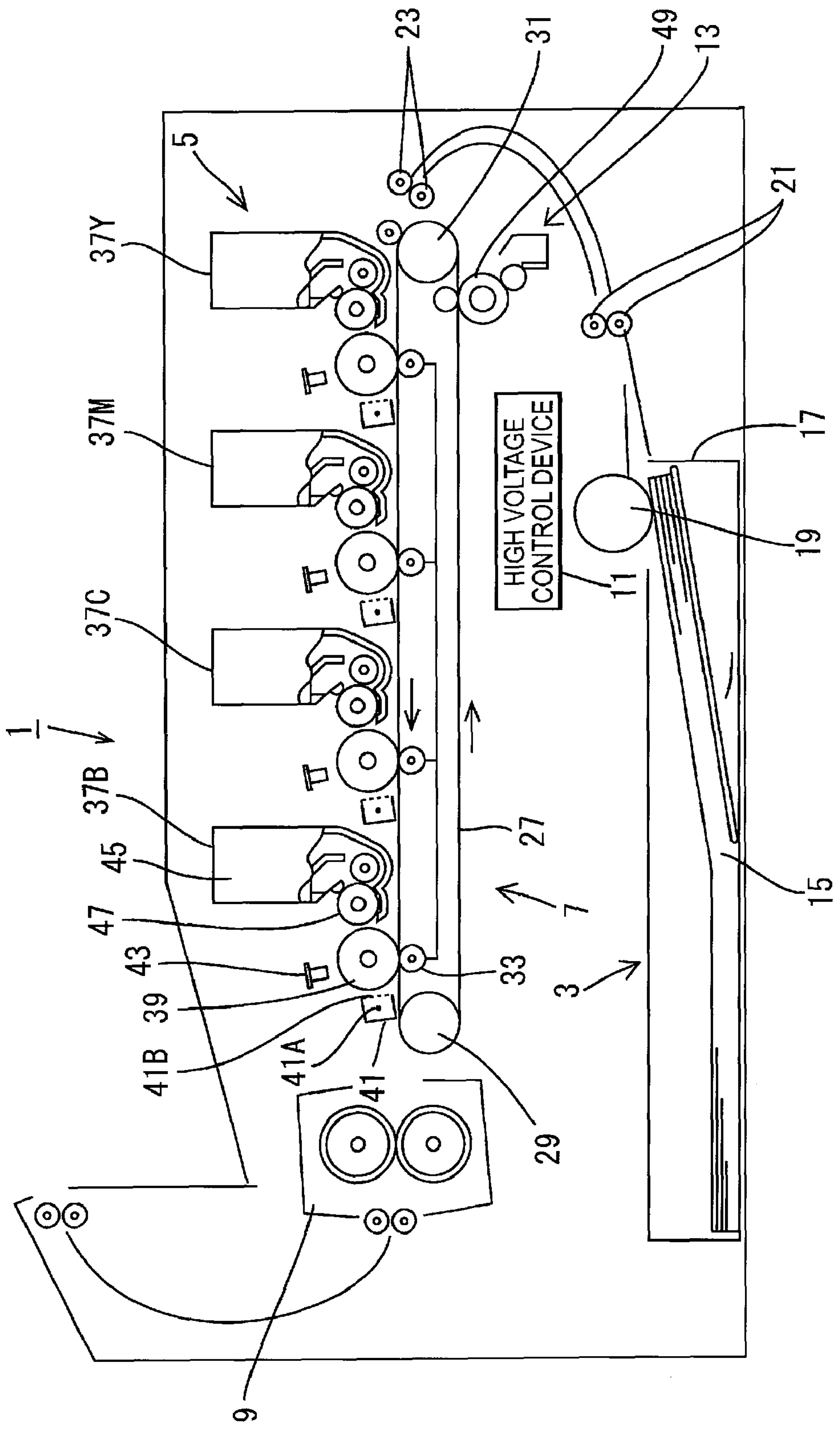
FIG. 1 is a schematic diagram showing an internal configuration of a printer according to an illustrative aspect 1 of the present invention.
Figure 2A:
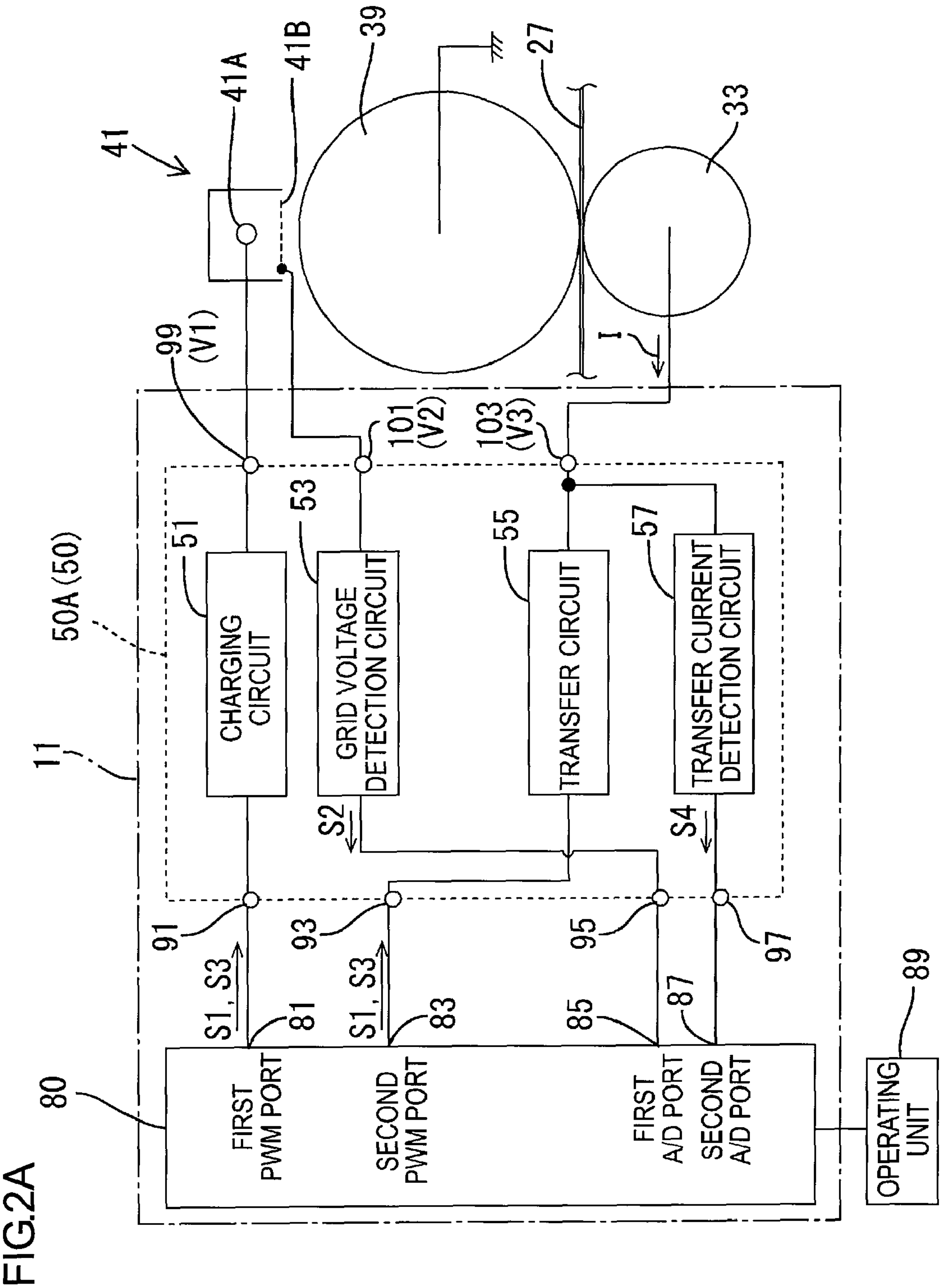
FIG. 2A is a block diagram (version 1) showing a configuration for supplying electric power to a charger and a transfer body.
Figure 2B:
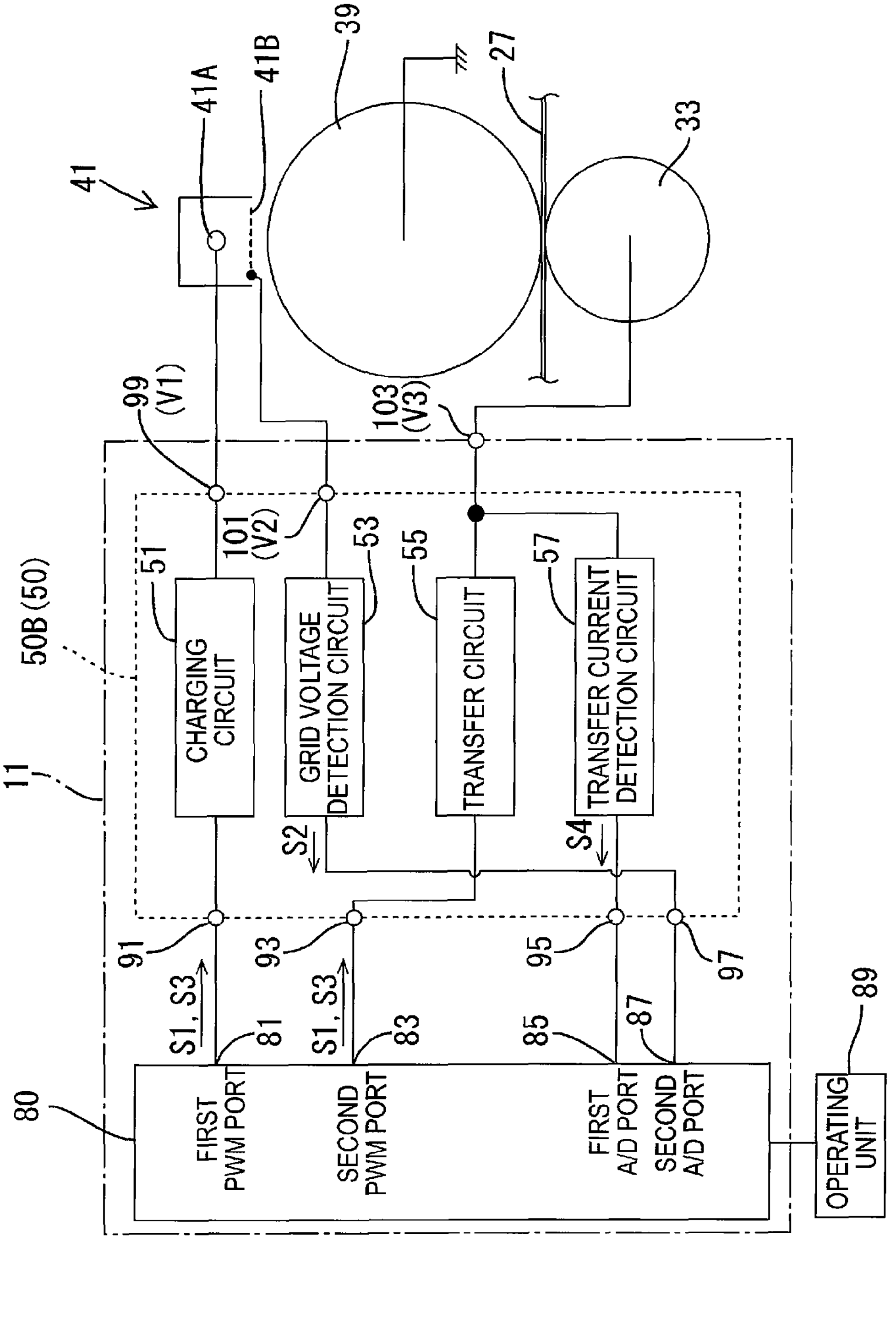
FIG. 2B is a block diagram (version 2) showing a configuration for supplying electric power to a charger and a transfer body.
Figure 3:
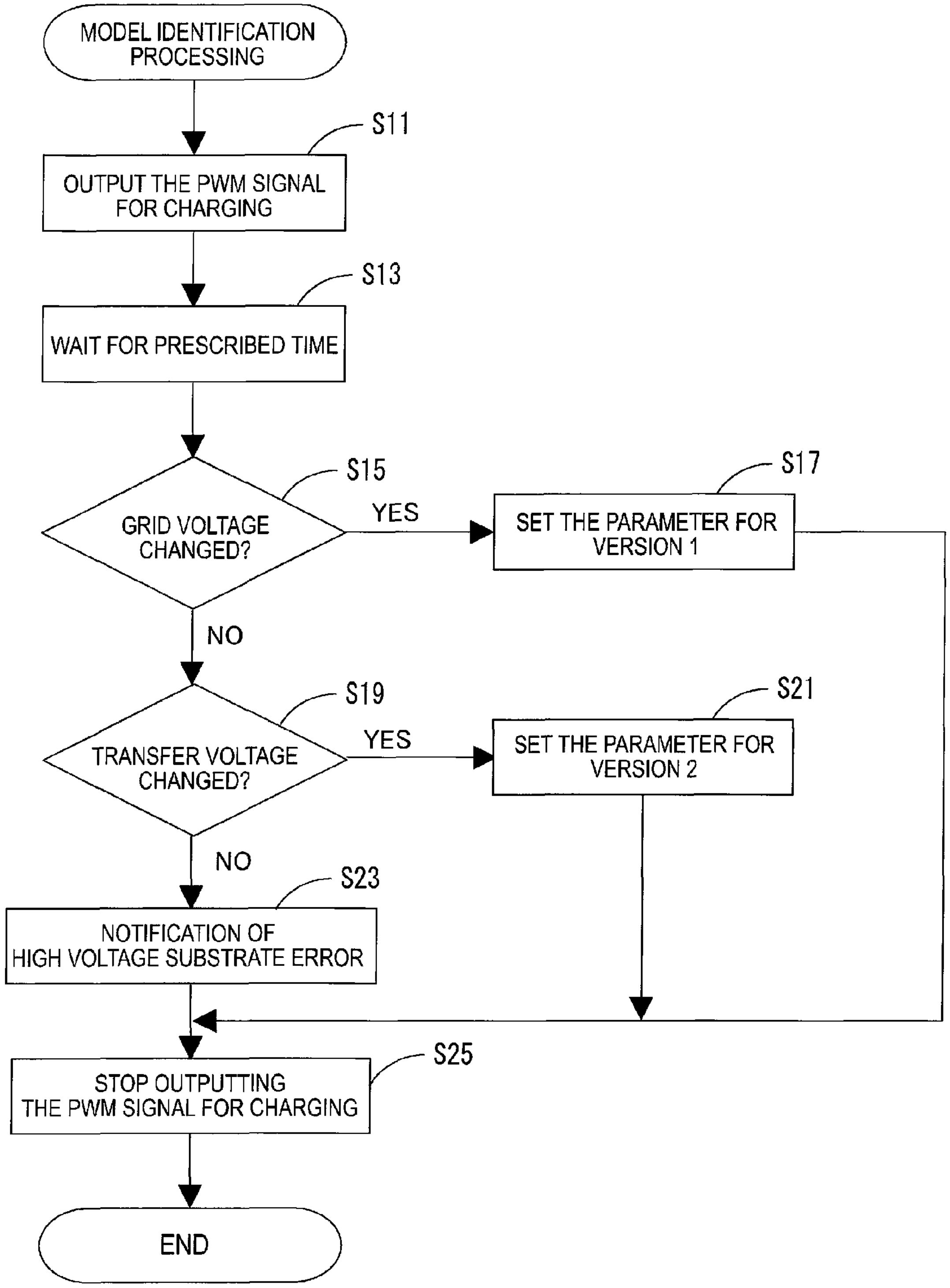
FIG. 3 is a flow chart showing a type identification processing.

The illustrative aspect 1 of the present invention is explained in reference to FIGS. 1 to 3.

(1) General Configuration of Printer

FIG. 1 is a schematic cross sectional view showing the internal configuration of a printer 1 (image forming apparatus) according to the present illustrative aspect. In the following description, when each component is distinguished by each color, the indexes: Y (yellow), M (magenta), C (cyan), and B (black), are respectively allotted to the numerals of each member, while being omitted when not distinguishing a component by colors.

The printer 1 comprises: a paper feeder 3, an image forming unit 5, a conveying mechanism 7, a fixing unit 9, and a high voltage control device 11, and forms a toner image corresponding to image data input from, for example, the outside and composed of one or multiple toner colors (in the present illustrative aspect, four colors: yellow, magenta, cyan, and black) on a sheet 15 (such as a paper sheet and an OHP sheet). Additionally, the printer 1 further comprises a cleaning mechanism 13.

The paper feeder 3 is provided in the lowest part of the printer 1 and comprises a tray 17 for storing the sheet 15 and a pick-up roller 19. The sheet 15 stored in the tray 17 is picked up by the pick-up roller 19 one by one, and then delivered to the conveying mechanism 7 through a conveying roller 21 and a registration roller 23.

The conveying mechanism 7 conveys the sheet 15, and is constituted by stretching a belt 27 between a driving roller 29 and a driven roller 31. With rotation of the driving roller 29, the belt 27 in a position opposed to a photoreceptor 39 moves leftward from the right in FIG. 1. This conveys the sheet 15, that has been delivered from the registration roller 23, down below the image forming unit 5. In addition, the conveying mechanism 7 comprises four transfer bodies 33 (for example, a transferring roller).

The image forming unit 5 has four developing units 37Y, 37M, 37C and 37B. Each developing unit 37 comprises the photoreceptor 39, a charger 42, an exposing device 43 and a unit case 45.

The photoreceptor 39 is constituted by forming a photosensitive layer of a positive charge type on a base material made of, for example, aluminum, and this aluminum base material is placed on a ground line of the printer 1. The charger 41 is what we call a scorotron charger, and has a charging wire 41A and a grid 41B. A charging voltage V1 is applied to the charging wire 41A, and a grid voltage V2 of the grid 41B is controlled so that the surface of the photoreceptor 39 wears nearly the same electrical potential (for example, +700V).

The exposing device 43 has a plurality of light emitting elements (for example, LEDs) aligned in a row along the rotational axis direction of the photoreceptor 39, and forms an electrostatic latent image on the surface of the photoreceptor 39 by controlling the light emission of these plurality of light emitting elements in accordance with the image data for one color input from the outside.

The unit case 45 stores toner of each color (in the present illustrative aspect, for example, a non-magnetic one component toner of a positive charge type), while having a developing body 47 (for example, a developing roller). The developing body 47 allows the toner to be charged positively (positive polarity) and supplied to the photoreceptor 39 as an even and thin-layer, so as to develop the above electrostatic latent image, thereby forming a toner image.

The above-mentioned each transfer body 33 is arranged in a position to hold the belt 27 with the above each photoreceptor 39. When a transfer voltage V3 having a reverse polarity against the charging polarity of the toner is applied in a gap between the transfer body 33 and the photoreceptor 39, each transfer body 33 transfers the above toner image formed on the photoreceptor 39 onto the sheet 15. After that, the present sheet 15 is delivered to the fixing unit 9 by the conveying mechanism 7, so that the toner image is heat-fixed by the fixing unit 9, and then discharged onto the upper surface of the printer 1.

The cleaning mechanism 13 is provided under the conveying mechanism 7, and removes deposits (such as the toner remained on the belt 27 and flakes of the sheet (paper powder)) on the belt 27 with the cleaning body 49 (for example, a cleaning roller).

(2) Configuration of High Voltage Control Device

The high voltage control device 11 supplies electric power to each electrical load (such as the charger 41, the developing body 47, the transfer body 33, and the cleaning body 49) comprised in the printer 1, while controlling the supplying electric power. In particular, the high voltage control device 11 comprises a high voltage circuit (or a high voltage board) 50 (power supply circuit) and a PWM control circuit 80 (power supply circuit identification device, control section, reading section, and identification section). Additionally, the PWM control circuit 80 may be constituted by mounting a CPU or as an application specific integrated circuit (ASIC).

FIGS. 2A and 2B are block diagrams showing the configuration for supplying electric power to the charger 41 and the transfer body 33 in the high voltage control device 11. The high voltage circuit 50 (50A, 50B) comprises a set of a charging circuit 51, a grid voltage detection circuit 53, a transfer circuit 55, and a transfer current detection circuit 57, for each toner color (FIG. 2 shows only one set thereof). And also, the high voltage circuit 50 comprises a first input terminal 91, a second input terminal 93, a first output terminal 95, and a second output terminal 97 which are connected to the side of the PWM control circuit 80, and, further comprises a connection terminal for charging 99, a connection terminal for grid 101, and a connection terminal for transfer 103 which are connected to the electrical loads.

(2-1) Configuration for Charging Voltage Control

The charging circuit 51 is connected to the charging wire 41A through the connection terminal for charging 99, and receives a PWM signal for charging S1 from the PWM control circuit 80, so as to supply the charging voltage V1 corresponding to the present PWM signal for charging S1 to the charging wire 41A. The grid voltage detection circuit 53 is connected to the grid 41B through the connection terminal for grid 101, and outputs a detection signal S2 corresponding to the grid voltage V2 of the grid 41B to the PWM control circuit 80.

The PWM control circuit 80 comprises a first PWM port 81 and a second PWM port 83 as an output port, as well as a first A/D port 85 and a second A/D port 87 as an input port. Connecting the high voltage circuit 50 to the PWM control circuit 80 through a connector not shown allows the first PWM port 81 to be connected to the first input terminal 91, the second PWM port 83 to the second input terminal 93, the first A/D port 85 to the first output terminal 95, and the second A/D port 87 to the second output terminal 97.

The PWM control circuit 80 then conducts a constant voltage control (hereinafter referred to as charging voltage control), by accordingly changing a PWM value (duty ratio) of the PWM signal for charging S1 based on the detection signal S2 received from the grid voltage detection circuit 53 so that the grid voltage V2 reaches closer to a target grid voltage (for example, +700[V]).

(2-2) Configuration for Transfer Current Control

The transfer circuit 55 is connected to the transfer body 33 through the connection terminal for transfer 103, and receiving a PWM signal for transfer S3 (control signal) from the PWM control circuit 80 causes the transfer circuit 55 to supply the transfer voltage V3 corresponding to the present PWM signal for transfer S3 to the transfer body 33. The transfer current detection circuit 57 outputs a detection signal S4 corresponding to a transfer current I to the PWM control circuit 80.

The PWM control circuit 80 then conducts a constant current control (hereinafter referred to as transfer current control), by accordingly changing the PWM value (duty ratio) of the PWM signal for transfer S3 based on the detection signal S4 received from the transfer current detection circuit 57, so that the transfer current I reaches closer to a target current value (for example, from −10 to −15 μA).

(3) Types of High Voltage Circuits

The high voltage circuit 50 includes a high voltage circuit (or a high voltage board) 50A (see FIG. 2A) and a high voltage circuit (or a high voltage board) 50B (see FIG. 2B). The types of these are different from each other, however, both can be connected to the PWM control circuit 80. In addition, the different type also means that the same type in different versions.

In the present illustrative aspect, the high voltage circuit 50A is version 1 and the high voltage circuit 50B is version 2. The difference between them is, for example, adjustable ranges of the output voltage. The adjustable range of the output voltage of version 1 is between 0 and 800[V], while that of version 2 is between 0 and 1000[V]. Therefore, parameters of the high voltage circuit 50A and the high voltage circuit 50B to adjust the charging voltage V1 and the transfer current I by PWM control, such as a default of the PWM value and the minimum changing amount of the PWM value, are different.

The PWM control circuit 80 is configured to control both high voltage circuits 50A and 50B, however, it needs to identify which one is currently connected. The PWM control circuit 80 can identify the high voltage circuit 50A or the high voltage circuit 50B through an identification process explained next. Additionally, an operating unit 89 for user's operation is connected to the PWM control circuit 80.

(4) Identification of the High Voltage Circuit (4-1) Correlation Between Input Terminal and Output Terminal of the High Voltage Circuit The correlation between the first input terminal 91 and the second input terminal 93, and between the first output terminal 95 and the second output terminal 97 are different in the high voltage circuits 50A and 50B. As shown in FIG. 2A, in the high voltage circuit 50A, the first input terminal 91 is connected to the input side of the charging circuit 51, and the first output terminal 95 is connected to the output side of the grid voltage detection circuit 53. In addition, the second input terminal 93 is connected to the input side of the transfer circuit 55, and the second output terminal 97 is connected to the output side of the transfer current detection circuit 57. In the high voltage circuit 50A, the first input terminal 91 and the first output terminal 95 are used for the charging voltage control, while the second input terminal 93 and the second output terminal 97 are used for the transfer current control.

On the other hand, as shown in FIG. 2B, in the high voltage circuit 50B, the first input terminal 91 is connected to the input side of the charging circuit 51, which is the same as the high voltage circuit 50A, however, the second output terminal 97 is connected to the output side of the grid voltage detection circuit 53. Moreover, the second input terminal 93 is connected to the input side of the transfer circuit 55, which is the same as the high voltage circuit 50A, however, the first output terminal 95 is connected to the output side of the transfer current detection circuit 57. In the high voltage circuit 50B, the first input terminal 91 and the second output terminal 97 are used for the charging voltage control, while the second input terminal 93 and the first output terminal 95 are used for the transfer current control.

(4-2) Identification of Types

FIG. 3 is a flow chart of the identification of types. When the printer 1 is turned on with the PWM control circuit 80 connected to any one of the high voltage circuits 50A and 50B, the PWM control circuit 80 executes the identification. The PWM control circuit 80 is configured in advance such that the first A/D port 85 is set for the grid voltage detection and the second A/D port 87 is set for the transfer current detection.

In the present illustrative aspect, a user has options to disable the execution of the identification when the printer 1 is turned on or enable the execution other than when the printer 1 is turned on. The PWM control circuit 80 switches between enabling and disabling of the identification according to an external request input by the user through the operating unit 89. Namely, the PWM control circuit 80 functions as a switching section. With this configuration, the user can switch between enabling and disabling of the identification as necessary.

In the identification, the PWM signal S1 (or S3) is input to the high voltage circuit 50 via any one of the first input terminal 91 and the second input terminal 93, or the PWM signals S1 and S3 having different PWM values are input to the high voltage circuit 50 via the first input terminal 91 and the second input terminal 93. The identification of the high voltage circuit 50 is conducted based on a reading result (reading pattern) of a signal from at least one of the first A/D port 85 and the second A/D port 87.

More specifically, the PWM control circuit 80 outputs the PWM signal for charging S1 from the first PWM port 81 in S11. The PWM control circuit 80 at this moment functions as a control section. However, the PWM value of the PWM signal for charging S1 at this moment is set to an activation level (for example, 30%) at which the charging circuit 51 starts to output the charging voltage V1, that is, the minimum level of the PWM value capable of outputting the charging voltage V1. When the above-mentioned PWM value is below the activation level, the value is in a dead zone region of a switching element (not shown) included in the charging circuit 51, and the charging voltage V1 is not output. The above-mentioned activation level is not limited to a certain level, and a range having the upper and the lower limits may be set. By using the PWM signal for charging S1 at the activation level, the power consumption related to the identification can be suppressed.

After waiting for predetermined time in S13, the PWM control circuit 80 determines whether the grid voltage V2 is changed in S15. In particular, it reads a detection signal input from the first A/D port 85 set for the grid voltage detection, and then determines whether the detection signal level is above a threshold. The PWM control circuit 80 at this moment functions as a reading section and a identification section (operates a reading step). If the high voltage circuit 50 currently connected is version 1 (the high voltage circuit 50A), the detection signal S2 at a level changed in accordance with the PWM signal for charging S1 input from the first input terminal 91 should be output from the first A/D port 85.

If the grid voltage V2 has been changed (S15: Yes), the PWM control circuit 80 determines that the high voltage circuit 50 currently connected is the high voltage circuit 50A, that is, version 1, in S17, and then it sets parameters for version 1. As a result, the PWM control circuit 80 can properly execute the charging voltage control or the transfer current control for the high voltage circuit 50A. Then, it stops the output of the PWM signal for charging S1 in S25 to complete the identification.

If the grid voltage V2 is not changed (S15: No), the PWM control circuit 80 determines whether the transfer current I is changed in S19. Specifically, it reads a detection signal output from the second A/D port 87 set for the transfer current detection. Then, it determines whether the detection signal level is above a threshold. The PWM control circuit 80 at this moment functions as a reading section, identification section (operates an identification step). If the high voltage circuit 50 currently connected is version 2 (the high voltage circuit 50B), the detection signal S2 at a level changed in accordance with the PWM signal for charging S1 input from the first input terminal 91 should be output from the second A/D port 87.

If the transfer current I has been changed (S19: Yes), the PWM control circuit 80 determines that the high voltage circuit 50 currently connected is the high voltage circuit 50B, that is version 2, in S21, and then it sets a parameters for version 2. As a result, the PWM control circuit 80 can properly execute the charging voltage control or the transfer current control for the high voltage circuit 50B. Then, it stops the output of the PWM signal for charging S1 in S25 to complete the identification.

If neither the grid voltage V2 nor the transfer current I are changed (S15: No, S19: No), a trouble may have occurred in the high voltage circuit 50. The PWM control circuit 80 sends a high voltage circuit error notification to the outside in S23. For example, the error notification may be shown on a display (not shown) of the printer 1, or may be output to a computer communicatively connected to the printer 1.

(5) Effect of the Present Illustrative Aspect

According to the present illustrative aspect, the high voltage circuit 50 is configured so as to have a type-dependent correlation between the input terminal and the output terminal, that is, the correlation different from type to type of the high voltage circuit 50. The PWM control circuit 80 inputs the PWM signal to the high voltage circuit 50 via the input terminal, and reads a detection signal output from the output terminal. A reading result varies according to the above mentioned correlation, and thus the PWM control circuit 80 can determines a type of the high voltage circuit 50 based on the reading result.

<Illustrative Aspect 2>

Figure 4A:
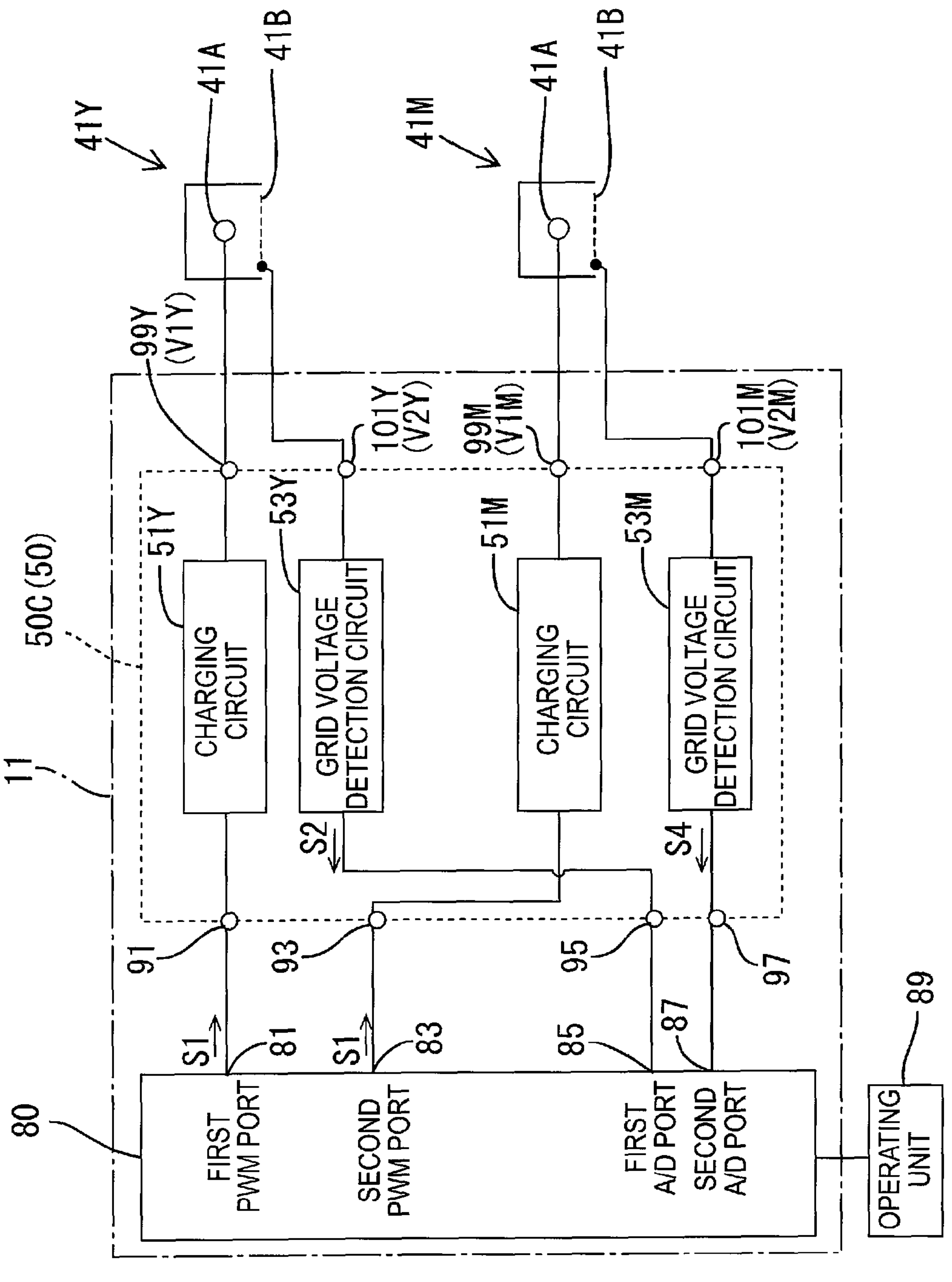
FIG. 4A is a block diagram (version 1) showing a configuration for supplying electric power to a charger according to an illustrative aspect 2.
Figure 4B:
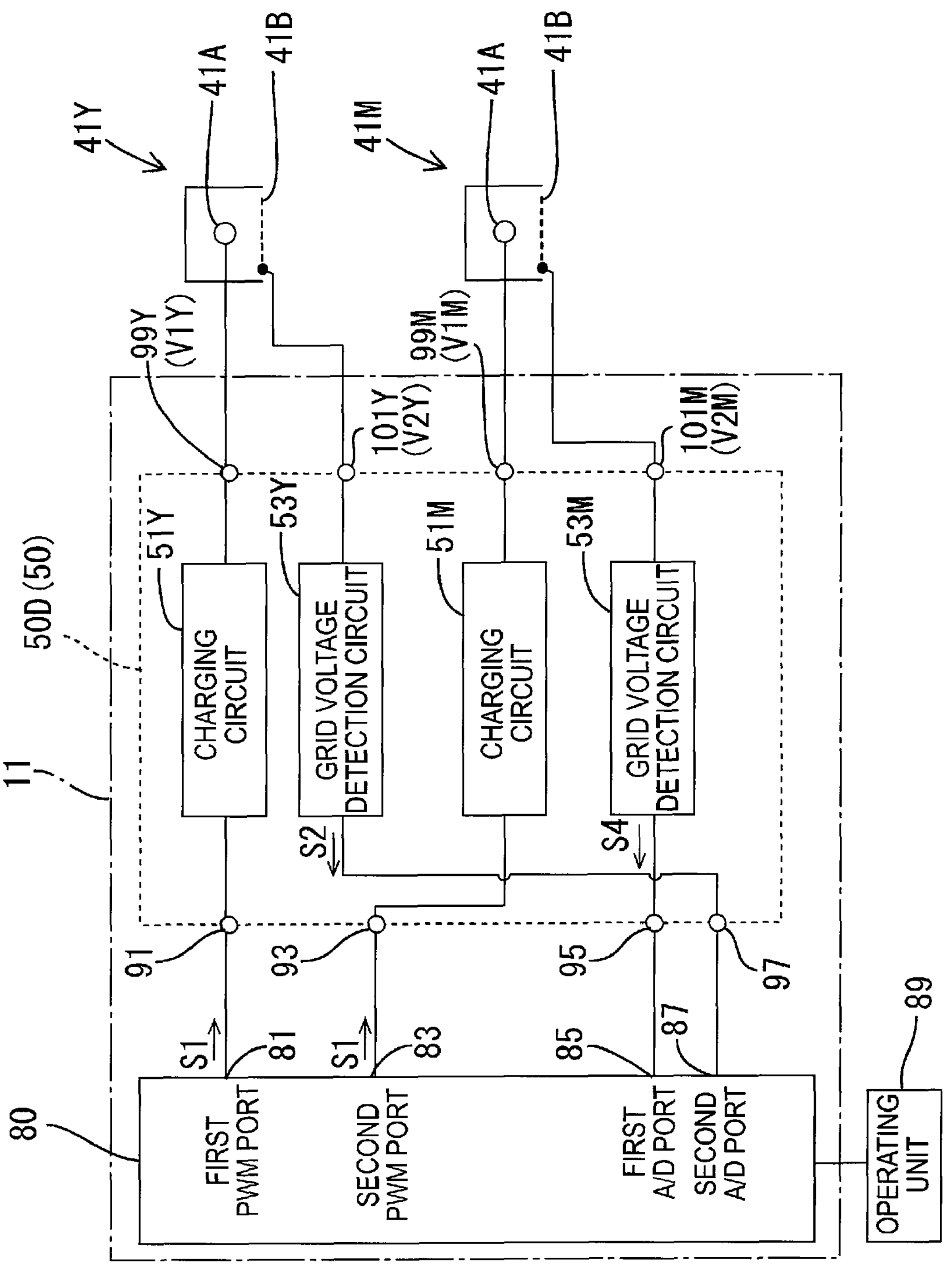
FIG. 4B is a block diagram (version 2) showing a configuration for supplying electric power to a charger.
Figure 5:
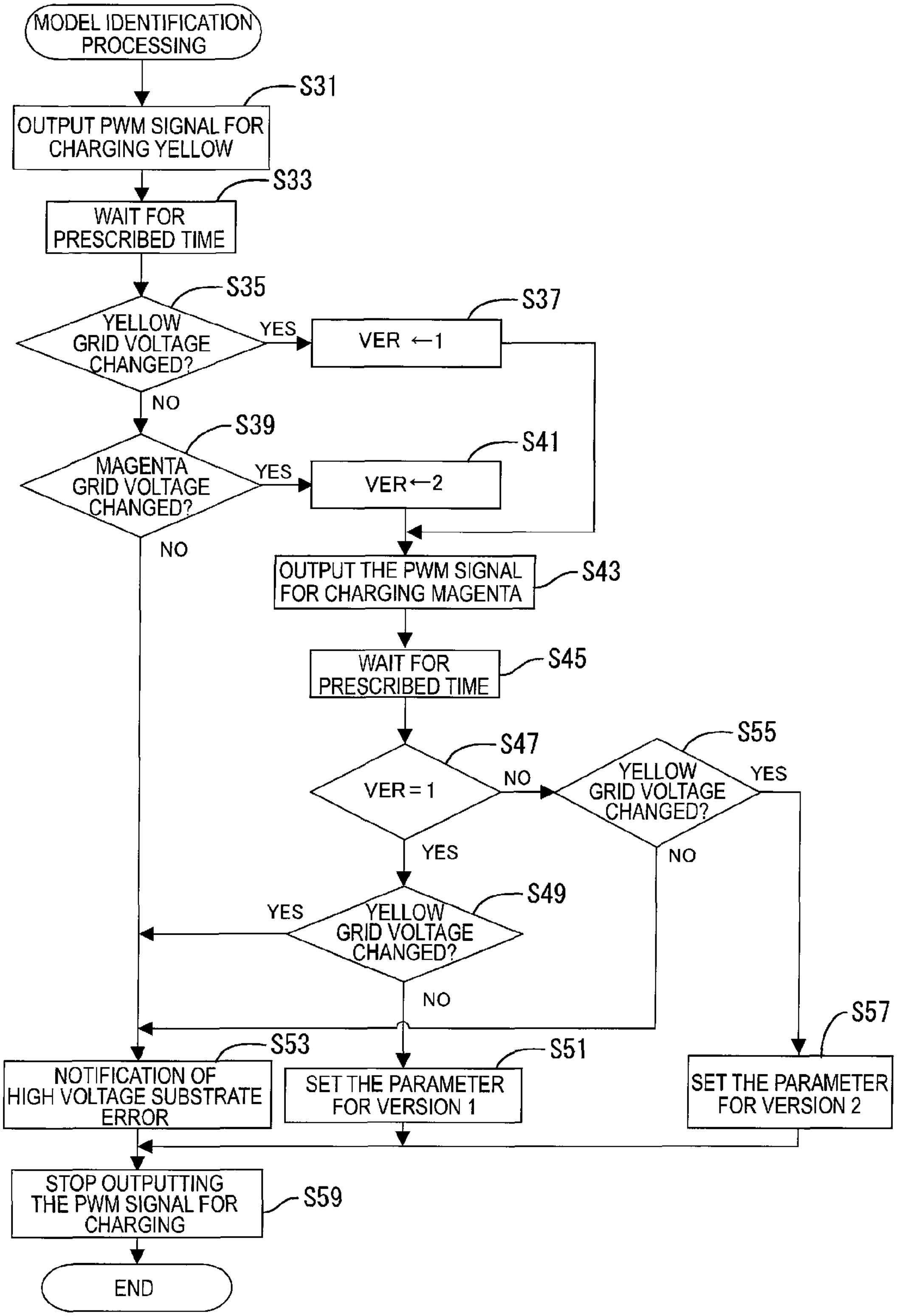
FIG. 5 is a flow chart showing a type identification processing.

FIGS. 4 and 5 show the illustrative aspect 2. The difference from the above illustrative aspect is the electrical load used for the identification, and other configurations are the same as the illustrative aspect 1. The same parts as the illustrative aspect 1 are indicated with the same symbols and will not be explained. In addition, the input terminals 91 and 93, the output terminals 95 and 97, the PWM ports 81 and 83, and the A/D ports 85 and 87 in the present illustrative aspect may be used for electric controls different from the one in the illustrative aspect 1, however, they are indicated with the same symbols to reduce confusion.

In the illustrative aspect 1, the electrical loads used in the identification are the charger 41 and the transfer body 33 of different types (functions), however, the same kind (the same function) of electrical loads are used in the present illustrative aspect. Specifically, a plurality of chargers 41 are used. More specifically, two chargers 41 are used. High voltage circuits 50C and 50D comprise, for example, a charging circuit 51Y and a grid voltage detection circuit 53Y for yellow, and a charging circuit 51M and a grid voltage detection circuit 53M for magenta.

(1) Correlation Between Input Terminal and Output Terminal of High Voltage Circuit FIGS. 4A and 4B are the block diagrams showing the configuration of the high voltage control device 11 for supplying electric power to four chargers 41 (in the Figs., only the chargers 41 for yellow and magenta are shown). As shown in FIG. 4A, the high voltage circuit 50C, that is, version 1 uses the first input terminal 91 and the first output terminal 95 for the charging voltage control for yellow; the second input terminal 93 and the first output terminal 97 for the charging voltage control for magenta. As shown in FIG. 4B, the high voltage circuit 50D, that is, version 2 uses the first input terminal 91 and the second output terminal 97 for the charging voltage control for yellow; the second input terminal 93 and the first output terminal 95 for the charging voltage control for magenta.

(2) Identification of Types

FIG. 5 is a flow chart of the identification. The PWM control circuit 80 is configured in advance such that the first A/D port 85 is set for the yellow grid voltage detection and the second A/D port 87 is set for the magenta grid voltage detection.

The PWM control circuit 80 outputs a PWM signal for charging yellow S1 at the above-mentioned activation level from the first PWM port 81 in S31. Then, after waiting for a predetermined time in S33, the PWM control circuit 80 reads a detection signal input from the first A/D port 85 and determines whether a yellow grid voltage V2Y is changed or in S35. If changed (S35: Yes), it sets the version setting value temporarily to 1 in S37, and proceeds to S43.

In S43, the PWM control circuit 80 stops the output of the PWM signal for charging yellow S1, and starts outputting a PWM signal for charging magenta S1 at the above-mentioned activation level from the second PWM port 83. Then, after waiting for a predetermined time in S45 and if the version setting value is 1 in S47 (S47: Yes), it reads a detection signal input from the first A/D port 85 and determines whether the yellow grid voltage V2Y is changed in S49. If not changed (S49: No), it determines the high voltage circuit 50 currently connected is the high voltage circuit 50C, that is, version 1 in S51, and it sets parameters for version 1. Then, it stops the output of the PWM signal for charging magenta S1 to complete the identification. If the yellow grid voltage V2Y has been changed in S49 (S49: Yes), it outputs a high voltage circuit error notification in S53.

If the yellow grid voltage V2Y is not changed in S35 (S49: No), the PWM control circuit 80 reads a detection signal input from the second A/D port 87 and determines whether a magenta grid voltage V2M is changed in S39. If changed (S39: Yes), it sets the version setting value temporarily to 2 in S41, and proceeds to S43.

Then, it outputs a PWM signal for charging magenta S1 in S43. After waiting for a predetermined time in S45 and if the version setting value is 2 in S47 (S47: No), it reads a detection signal input from the first A/D port 85 and determines whether the yellow grid voltage V2Y is changed in S55. If changed (S55: Yes), it determines that the high voltage circuit 50 currently connected is the high voltage circuit 50D, that is, version 2 in S57, and sets parameters for version 2. Then, it proceeds to S59. If the yellow grid voltage V2Y has not been changed in S55 (S49: No), it outputs a high voltage circuit error notification in S53.

(3) Effect of Present Illustrative Aspect

According to the present illustrative aspect, the input terminal and the output terminal having different correlation depending on the types are used for the power supply to the electrical loads of the same kind. Namely, the levels of power (the detection signal levels) supplied to the electrical loads set according to the PWM signals S1 at the same level should be substantially the same. Accordingly, whether detection signals output from the output terminals are proper signals for the control signals input from one or some of the input terminals is determined based on the same reference. Thus, false detection is less likely to occur.

Moreover, the chargers 41 of the same kind are used as electrical loads in the present illustrative aspect. Therefore, the chargers 41 of each color may be controlled by the PWM signal S1 for other colors in the identification, though they are not controlled by the PWM signal for electrical loads of different kinds, such as the transfer body 33. Therefore, the photoreceptor 39 is less likely to be damaged because an inappropriate charging voltage is not applied to the chargers 41.

<Illustrative Aspect 3>

Figure 6A:
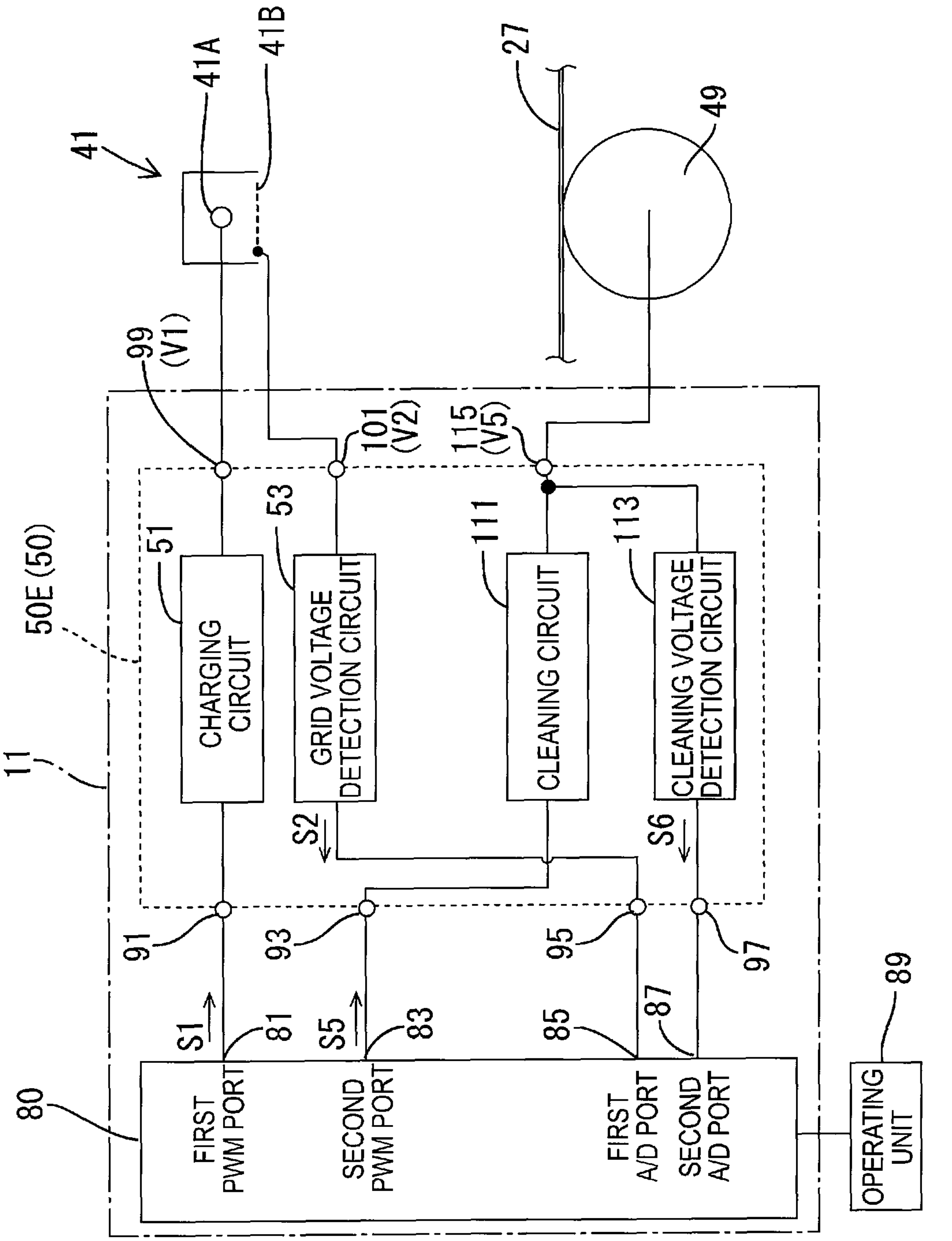
FIG. 6A is a block diagram (version 1) showing a configuration for supplying electric power to a charger and a cleaning body according to an illustrative aspect 3.
Figure 6B:
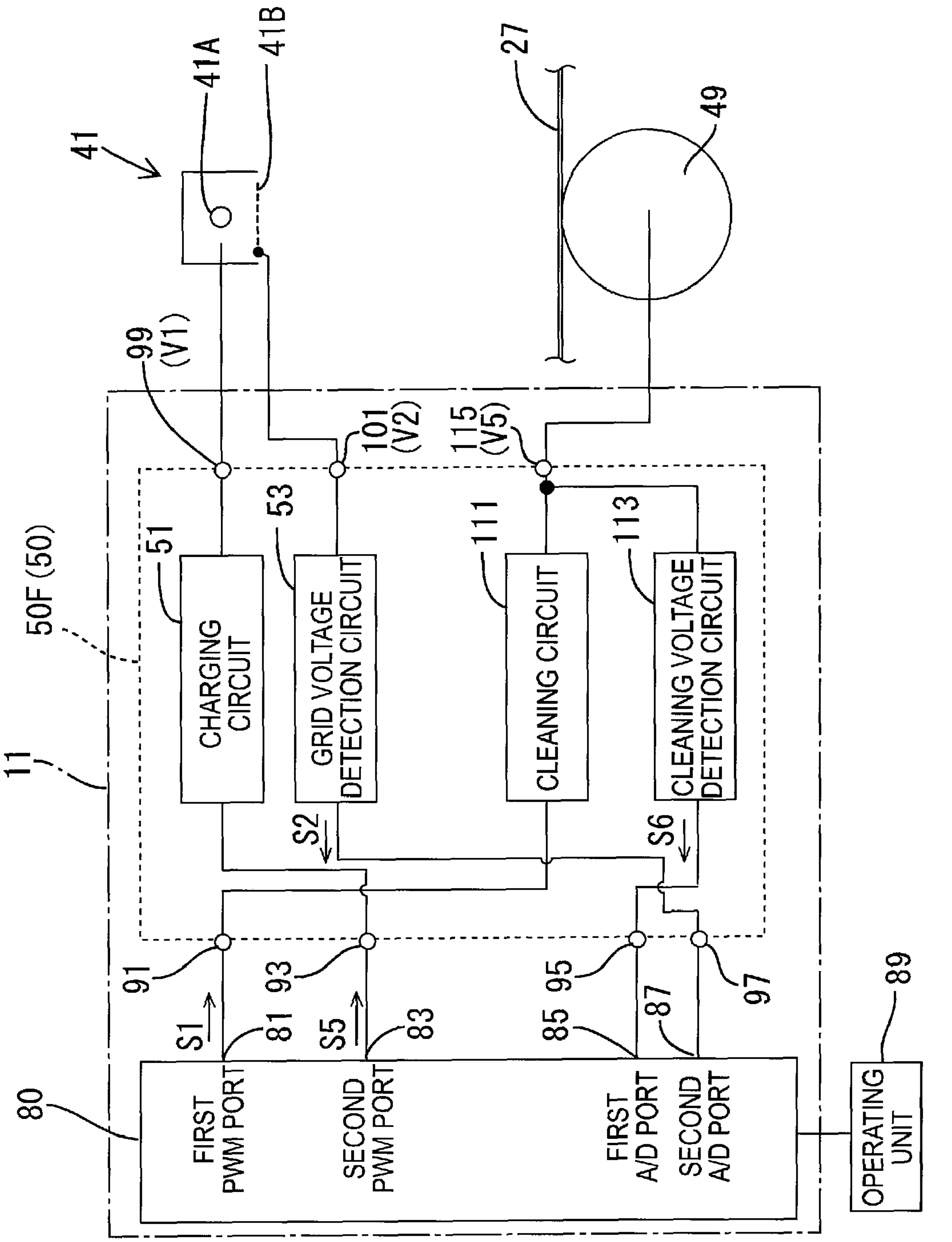
FIG. 6B is a block diagram (version 2) showing a configuration for supplying electric power to a charger and a cleaning body.
Figure 7:
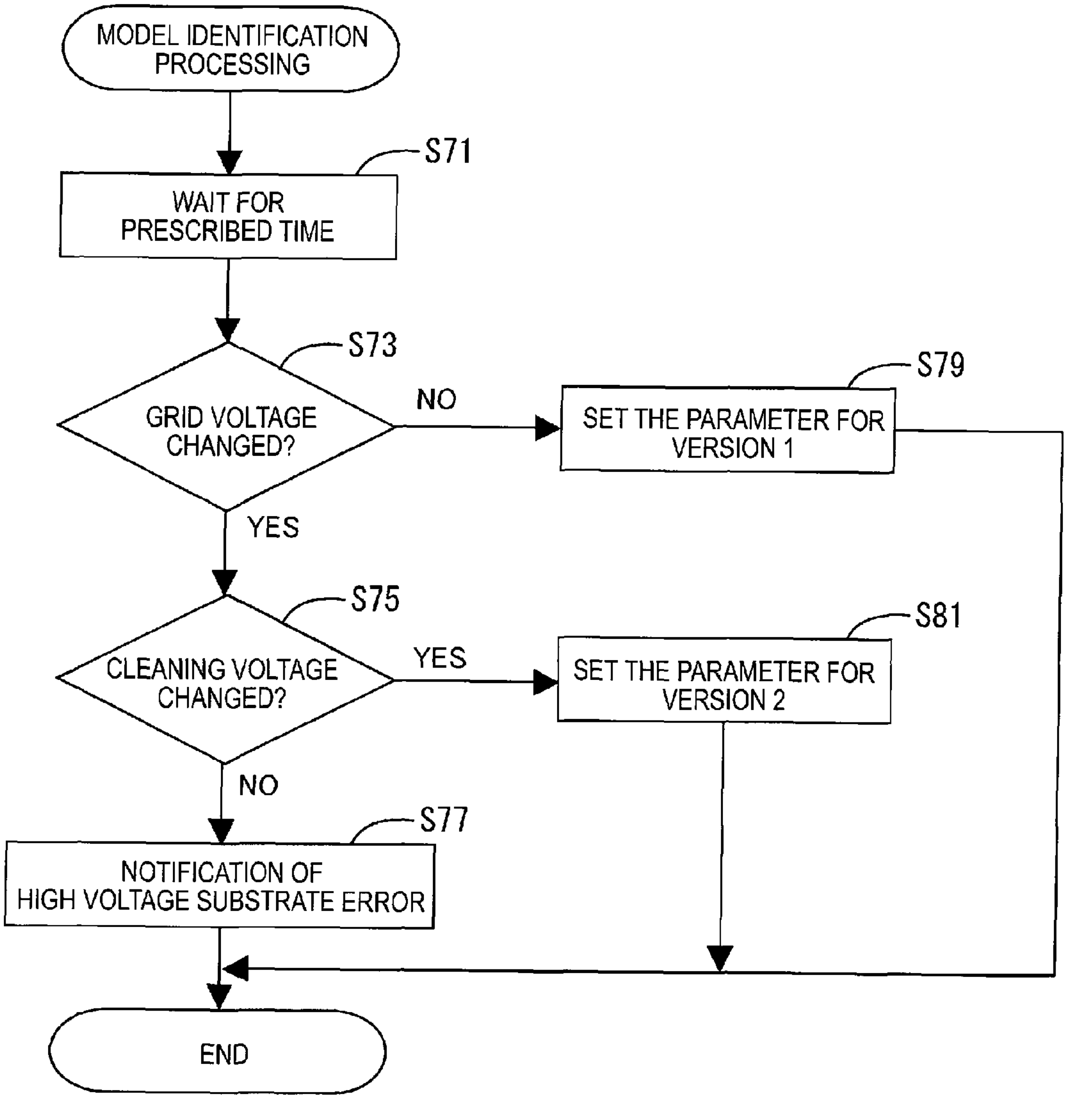
FIG. 7 is a flow chart showing a type identification processing.

FIGS. 6 and 7 show the illustrative aspect 3. The difference from the illustrative aspect 1 is the electrical load used for the identification, and other configurations are the same as the illustrative aspect 1. The same parts as the illustrative aspect 1 are indicated with the same symbols and will not be explained. In addition, the input terminals 91 and 93, the output terminals 95 and 97, the PWM ports 81 and 83, and the A/D ports 85 and 87 in the present illustrative aspect may be used for electric controls different from the one in the illustrative aspect 1, however, they are indicated with the same symbols to reduce confusion.

(1) Configuration of High Voltage Control Circuit

FIGS. 6A and 6B are block diagrams showing the configuration for supplying electric power to the charger 41 and the cleaning body 49 in the high voltage control device 11. The high voltage circuit 50 (50E, 50F) comprises a charging circuit 51, a grid voltage detection circuit 53, a cleaning circuit 111, and a cleaning voltage detection circuit 113. The high voltage circuit 50 also comprises a first input terminal 91, a second input terminal 93, a first output terminal 95, and a second output terminal 97 that are connected to the side of the PWM control circuit 80, and further comprises a connection terminal for charging 99, a connection terminal for grid 101, and a connection terminal for cleaning 115 that are connected to the electrical load side.

(1-1) Configuration for Charging Voltage Control

Receiving the PWM signal for charging S1 from the PWM control circuit 80, the charging circuit 51 supplies a positive charging voltage V1 corresponding to the present PWM signal for charging S1 to the charging wire 41A. The grid voltage detection circuit 53 outputs a positive detection signal S2 corresponding to the grid voltage V2 of the grid 41B to the PWM control circuit 80. The charging circuit 51 has positive output characteristics such that a higher charging voltage V1 is output as the PWM value of the PWM signal for charging S1 is larger. The grid voltage detection circuit 53 therefore outputs a higher level of detection signal as the above-mentioned PWM value is larger. In short, the grid voltage detection circuit 53 has positive detection characteristics (feedback characteristics) such that the level of the detection signal S2 becomes low (for example, 0 [V]) when the PWM signal for charging S1 having the minimum PWM value (for example, 0%) is input.

(1-2) Configuration for Cleaning Voltage Control

The cleaning circuit 111 is connected to the cleaning body 49 through the connection terminal for cleaning 115, and receives a PWM signal for cleaning S5 (control signal) from the PWM control circuit 80, so as to supply a negative cleaning voltage V5 corresponding to the present PWM signal for cleaning S5 to the cleaning body 49. The cleaning voltage detection circuit 113 outputs a positive detection signal S6 corresponding to the cleaning voltage V5 to the PWM control circuit 80.

The PWM control circuit 80 then conducts a constant voltage control (hereinafter referred to as cleaning voltage control) by accordingly changing the PWM value (duty ratio) of the PWM signal for cleaning S5 based on the detection signal S6 received from the cleaning voltage detection circuit 113, so that the cleaning voltage V5 reaches closer to a target voltage value.

In addition, the cleaning circuit 111 has a negative output characteristics such that a lower charging voltage V1 is output as the PWM value of the PWM signal for cleaning S5 is larger. Therefore, the cleaning voltage detection circuit 113 outputs a lower level of detection signal as the above-mentioned PWM value is larger. In short, the cleaning voltage detection circuit 113 has negative detection characteristics (feedback characteristics) such that the detection signal S6 becomes high when the PWM signal for cleaning S5 having the minimum PWM value (for example, 0%) is input.

(2) Identification of High Voltage Circuit (2-1) Correlation Between Input Terminal and Detection Characteristics of High Voltage Circuit The high voltage circuits 50E and 50F have inverted correlation with the detection characteristics between the first input terminal 91 and the second input terminal 93. Specifically, as shown in FIG. 6A, the high voltage circuit 50E, that is, version 1 has the first input terminal 91 connected to the input side of the charging circuit 51 and the first output terminal 95 connected to the output side of the grid voltage detection circuit 53. It also has the second input terminal 93 connected to the input side of the cleaning circuit 111 and the second output terminal 97 connected to the output side of the cleaning voltage detection circuit 113. In other words, the high voltage circuit 50E uses the first input terminal 91 and the first output terminal 95 for the charging voltage control having positive detection characteristics, and the second input terminal 93 and the second output terminal 97 for the cleaning voltage control having negative detection characteristics.

As shown in FIG. 6B, the high voltage circuit 50F, that is, version 2 has the first input terminal 91 connected to the input side of the cleaning circuit 111 and the first output terminal 95 connected to the output side of the cleaning voltage detection circuit 113. It also has the second input terminal 93 connected to the input side of the charging circuit 51 and the second output terminal 97 connected to the output side of the grid voltage detection circuit 53. In other words, in the high voltage circuit 50F uses the first input terminal 91 and the first output terminal 95 for the cleaning voltage control having negative detection characteristics, and the second input terminal 93 and the second output terminal 97 for the charging voltage control having positive detection characteristics.

(2-2) Identification of Types

FIG. 7 is a flow chart of the identification of types. When the printer 1 is turned on with the high voltage circuit 50E or 50F connected to the PWM control circuit 80, the PWM control circuit 80 executes the identification of types. The PWM control circuit 80 is configured in advance such that the first PWM port 81 and the first A/D port 85 are set for the grid voltage detection, and the second PWM port 83 and the second A/D port 87 are set for the cleaning voltage detection.

At the beginning of the identification, the PWM control circuit 80 initially sets the PWM value of the PWM signal for charging S1 and the PWM signal for cleaning S5 to the minimum value (for example, 0%: may be the maximum value 100%). The PWM control circuit 80 then waits for a predetermined time with the above-mentioned PWM value still being the initial level in S71, and determines whether the grid voltage V2 is changed in S73. Specifically, it reads a detection signal input from the first A/D port 85 set for the grid voltage detection (reading step), and determines whether the detection signal level exceeds a threshold (identification step). If the high voltage circuit 50 currently connected is version 1 (the high voltage circuit 50E), the minimum level of the detection signal S2 should be input from the first A/D port 85 according to the positive detection characteristics.

If the grid voltage V2 is not changed (S73: No), the PWWM control circuit 80 determines that the high voltage circuit 50 currently connected is the high voltage circuit 50E, that is, version 1 in S79, and sets parameters for version 1. As a result, the PWM control circuit 80 can properly execute the charging voltage control and the cleaning voltage control for the high voltage circuit 50E. Then, it completes the identification.

If the grid voltage V2 is changed (S73: Yes), the PWM control circuit 80 determines whether the cleaning voltage V5 is changed in S75. Specifically, it reads a detection signal input from the second A/D port 87 set for the cleaning voltage detection, and determines whether the detection signal level exceeds a threshold. If the high voltage circuit 50 currently connected is version 2 (the high voltage circuit 50F), the maximum level of the detection signal S6 should be input from the second A/D port 87 according to the negative detection characteristics.

If the cleaning voltage V5 is changed (S75: Yes), the PWM control circuit 80 determines that the high voltage circuit 50 currently connected is the high voltage circuit 50F, that is, version 2 in S81, and sets parameters for version 2. As a result, the PWM control circuit 80 can properly execute the charging voltage control and the cleaning voltage control for the high voltage circuit 50F. Then, it completes the identification.

If neither the grid voltage V2 nor the cleaning voltage V5 are changed (S73: Yes, S75: No), a trouble may occur in the high voltage circuit 50. Thus, the PWM control circuit 80 sends a high voltage circuit error notification to the outside in S77.

(3) Effect of Present Illustrative Aspect

According to the present illustrative aspect, the first input terminal 91 and the second input terminal 93 of the high voltage circuit 50 have a different detection characteristics, and the high voltage circuit 50 is configured such that the correlation with the detection characteristics between the first input terminal 91 and the second input terminal 93 are inverted between the types. The PWM signals S1 and S5 are input to the high voltage circuit 50 via any one of the first input terminal 91 and the second input terminal 93, and the detection signals S2 and S6 from the output terminals 95 and 97 are read. A result of the reading should vary according to the above mentioned correlation, and thus a type of the high voltage circuit 50 can be identified based on the reading result.

Moreover, the reading result varies dramatically depending on the positive or negative detection characteristics. Therefore, the identification can be accurately performed. In addition, the identification can be performed in an early stage with the initial PWM value (for example, with the PWM value at a startup of the power supply circuit) without changing the PWM value of the PWM signals S1 and S5, or regardless of the dead zone region of the switching element.

<Other Illustrative Aspects>

The present invention is not limited to the illustrative aspect s described in the above with reference to the accompanying figures, and, for example, the following can also be included in the technical scope of the present invention. Particularly, among the components in each illustrative aspect, components other than those of the most significant invention are additional elements, and can therefore be accordingly omitted.

(1) In the above illustrative aspects, the PWM control circuit 80 mounted in the printer 1 is described as an example of "power supply circuit identification device", however, the present invention is not limited to this. It may be a single body of the power supply circuit identification device having the same function as the PWM control circuit 80.

(2) In the above illustrative aspects, two electrical loads are used in the type identification processing, however, the present invention is not limited to this. For example, three or more may be used for identifying three or more types of the power supply circuit.

(3) In the illustrative aspect 1, the outputting destinations of the grid voltage detection circuit 53 and the transfer current detection circuit 57 (the first output terminal 95, the second output terminal 97) are different for the high voltage circuit 50A and the high voltage circuit 50B, however, the present invention is not limited to this. The input source of the charging circuit 51 and the transfer circuit 55 (the first input terminal 91, the second input terminal 93) may be different. In short, the correlation between the first input terminal 91 and the second input terminal 93, and the first output terminal 95 and the second output terminal 97 may at least be different for the high voltage circuit 50A and the high voltage circuit 50B.

(4) In the illustrative aspect 1, the PWM signal for charging S1 is output from the first PWM port 81 in the type identification processing, however, the present invention is not limited to this. For example, the PWM signal for transfer S3 may be output from the second PWM port 93. And also, for an improved accuracy, both of the above may be executed so as to conduct the type identification of the high voltage circuit 50 based on both results.

(5) In the illustrative aspect 1, the power supply circuit comprising the same number of the input terminal and the output terminal is described as an example, however, the present invention is not limited to this. The number of the output terminal may be greater than that of the input terminal. For example, there is a power supply circuit comprising a transfer voltage detection circuit for measuring an impedance of the transfer current path in the transfer current control. This power supply circuit may be constituted in such a manner that two output terminals corresponding to each the transfer current detection circuit 57 and the transfer voltage detection circuit are comprised for one input terminal connected to the input side of the transfer circuit 55. Even in such configuration, the same type identification as the illustrative aspect 1 is possible by varying the correlation between each detection circuit and the output terminal in accordance with the types.

(6) In the illustrative aspect 2, the charger 41 is described as an example, however, the present invention is not limited to this. Any of multiple electrical loads of the same kind comprised in the printer 1 may be applicable: for example, multiple transfer bodies 33 or multiple developing bodies 47 for each color.

(7) In the illustrative aspect 2, in the type identification processing, while one of the PWM signal for charging yellow S1 and the PWM signal for charging magenta is being output (PWM value>0), the output of the other is stopped (PWM value=0), however, the present invention is not limited to this. The type identification is possible when PWM values of both the PWM signals are different each other.

(8) The illustrative aspect 3 describes an example in which the type identification is conducted by using the charger 41 and the cleaning body 49, however, the present invention is not limited to this. For example, the charger 41 and a photoreceptor cleaning body may be used. The photoreceptor cleaning body (not shown) is, for example, provided as corresponding to each photoreceptor 39, and removes deposits on the photoreceptor 39 when a cleaning voltage of a polarity reverse to the charging voltage V1 is applied thereto. Accordingly, the application same as the illustrative aspect 3 is possible for the photoreceptor cleaning body. In short, any electrical loads, to which voltages of mutually reversed polarities are applied, can realize the configuration same as the illustrative aspect 3.

Also, it is not always necessary to use the electrical loads to which voltages of reversed polarities are applied. In short, regardless of the application of a voltage of a reverse polarity, any electrical loads to be controlled by electrical control having different detection properties, positive or negative, may be used. However, when each of the electrical loads have the same polarity, it is required in the type identification processing to input a control signal of a level at which the output of such as the charging circuit 51 does not surpass the limit.

(9) In the illustrative aspect 3, the correlation between the input terminal and the output terminal are the same in both the high voltage circuits 50E and 50F, however, the present invention is not limited to this. The correlation between the input terminal and the output terminal may be different for the high voltage circuits 50E and 50F like the illustrative aspect 1. For example, the high voltage circuits 50E and 50F may have the same correlation between the output terminals 95 and 97 and the detection circuits 53 and 113.

(10) In the illustrative aspect 3, the power supply circuit comprising the same number of the input terminal and the output terminal is described as an example, however, the present invention is not limited to this. The number of the output terminal may be greater than that of the input terminal. There are electrical loads such as, for example, the photoreceptor cleaning body that is applied with a voltage of a positive polarity or a negative polarity, depending on the type of the printer 1. In order to respond to both types, there is a power supply circuit comprises a positive voltage output circuit and a negative voltage output circuit, while at the same time, comprising a shared detection circuit for outputting a detection signal corresponding to the output voltage of both the voltage output circuits. This power supply circuit comprises two input terminals for each voltage output circuit, and on the other hand, may comprise one output terminal for the shared detection circuit. The illustrative aspect 3 can be applied even to such configuration.

What is claimed is:

1. A power supply circuit identification device for identifying a type of a power supply circuit that supplies electrical power to an electrical load, the power supply circuit having an input terminal to which a control signal for controlling the electrical power supplied to the electrical load is input and an output terminal from which a detection signal is output, wherein the detection signal indicates whether the electrical power corresponding to the control signal input from the input terminal is supplied to the electrical load, at least one of the input terminal and the output terminal being plurally provided and having a type-dependent correlation between the input and output terminals, the power supply circuit identification device configured to function as:

- a control section configured to input the control signal to the power supply circuit via the input terminal;
- a reading section configured to read the detection signal from the output terminal; and
- an identification section configured to identify the type of the power supply circuit based on a reading result from the reading section,
- wherein the control signal input from the control section to the power supply circuit via the input terminal is an activation level signal configured to start power supply from the power supply circuit to the electrical load.

2. An image output device for outputting a color image on an image output medium, comprising:

- a plurality of electrical loads of a same kind, each of which is provided for each of a plurality of colors;
- a power supply circuit having an input terminal to which a control signal for controlling the electrical power supplied to the plurality of electrical loads is input and an output terminal from which a detection signal is output, wherein the detection signal indicates whether the electrical power corresponding to the control signal input from the input terminal is supplied to the electrical load, at least one of the input terminal and the output terminal being plurally provided and having a type-dependent correlation between the input and output terminals; and
- the power supply circuit identification device according to claim 1, wherein:
  - the input terminal and the output terminal are provided in a same number as the electrical loads; and
  - the control section inputs a different level of the control signal to the power supply circuit via at least one of the input terminals than that of the control signal input via other input terminals to identify a type of the power supply circuit.

3. The image output device according to claim 2, further comprising a switching section configured to switch between enabling and disabling of the identification section according to an external request.

4. A power supply circuit identification device for identifying a type of a power supply circuit that supplies electrical power to an electrical load, the power supply circuit having a first input terminal and a second input terminal to which control signals for controlling the electrical power supplied to the electrical load is input, at least one output terminal from which a detection signal is output, wherein the detection signal indicates whether the electrical power corresponding to the control signals input from the first input terminal and the second input terminal, respectively, is supplied to the electrical load, detection characteristics indicated by a higher level detection signal and a lower level detection signal for the control signals input via the first input terminal and the second input terminal, and inverted correlation with the detection characteristics between the first input terminal and the second input terminal, the power supply circuit identification device configured to function as:

- a control section configured to input the control signal to the power supply circuit via the input terminal;
- a reading section configured to read the detection signal from the output terminal; and
- an identification section configured to identify the type of the power supply circuit based on a reading result from the reading section,
- wherein:
  - the control section inputs one of lowest level and highest level of the control signal;
  - the reading section reads the detection signal output with the control signal at an initial level; and
  - the identification section identifies a type of the power supply circuit based on the reading result.

5. A power supply circuit identification method for identifying a type of a power supply circuit that supplies electrical power to an electrical load, the power supply circuit having an input terminal to which a control signal for controlling the electrical power supplied to the electrical load is input and an output terminal from which a detection signal is output, wherein the detection signal indicates whether the electrical power corresponding to the control signal input from the input terminal is supplied to the electrical load, at least one of the input terminal and the output terminal being plurally provided and having a type-dependent correlation between the input and output terminals, the power supply circuit identification method comprising:

- inputting a control signal to the power supply circuit via the input terminal;
- reading a detection signal corresponding to the control signal; and
- identifying the type of the power supply circuit based on a reading result obtained in the reading step,
- wherein the control signal input to the power supply circuit via the input terminal is an activation level signal configured to start power supply from the power supply circuit to the electrical load.

6. The power supply circuit identification method according to claim 5, wherein the power supply circuit is provided in an image output device for outputting a color image on an image output medium,

- wherein the image output device includes a plurality of electrical loads of a same kind, each of which is provided for each of a plurality of colors;
- wherein the input terminal and the output terminal are provided in a same number as the electrical loads; and wherein inputting the control signal includes inputting a different level of the control signal to the power supply circuit via at least one of the input terminals than that of the control signal input via other input terminals to identify the type of the power supply circuit; and wherein the control signal input to the power supply circuit is an activation level signal configured to start power supply from the power supply circuit to one or more of the electrical loads.

7. The power supply circuit identification method according to claim 6, further comprising:

switching between enabling and disabling of the identifying step according to an external request.

8. A power supply circuit identification method for identifying a type of a power supply circuit that supplies electrical power to an electrical load, the power supply circuit having a first input terminal and a second input terminal to which control signals for controlling the electrical power supplied to the electrical load is input, at least one output terminal from which a detection signal is output, wherein the detection signal indicates whether the electrical power corresponding to the control signals input from the first input terminal and the second input terminal, respectively, is supplied to the electrical load, detection characteristics indicated by a higher level detection signal and a lower level detection signal for the control signals input via the first input terminal and the second input terminal, and inverted correlation with the detection characteristics between the first input terminal and the second input terminal, the power supply circuit identification method comprising:

inputting a control signal to the power supply circuit via at least one of the first input terminal and the second input terminal;

reading a detection signal corresponding to the control signal; and identifying a type of the power supply circuit based on a reading result obtained in the reading step, wherein:

inputting the control signal includes inputting one of a lowest level and a highest level of the control signal;

reading the detection signal includes reading a detection signal output with the control signal at an initial level; and identifying the type of the power supply circuit is performed based on the reading result.

9. A power supply circuit identification device for identifying a type of a power supply circuit that supplies electrical power to an electrical load, the power supply circuit having an input terminal to which a control signal for controlling the electrical power supplied to the electrical load is input and an output terminal from which a detection signal is output, wherein the detection signal indicates whether the electrical power corresponding to the control signal input from the input terminal is supplied to the electrical load, at least one of the input terminal and the output terminal being plurally provided and having a type-dependent correlation between the input and output terminals, the power supply circuit identification device configured to function as:

a control section configured to input the control signal to the power supply circuit via the input terminal;

a reading section configured to read the detection signal from the output terminal;

an identification section configured to identify a type of the power supply circuit based on a reading result from the reading section; and a switching section configured to switch between enabling and disabling of the identification section according to an external request.

10. An image output device for outputting a color image on an image output medium, comprising:

a plurality of electrical loads of a same kind, each of which is provided for each of a plurality of colors;

a power supply circuit having an input terminal to which a control signal for controlling the electrical power supplied to the plurality of electrical loads is input and an output terminal from which a detection signal is output, wherein the detection signal indicates whether the electrical power corresponding to the control signal input from the input terminal is supplied to the electrical load, at least one of the input terminal and output terminal being plurally provided and having a type-dependent correlation between the input and output terminals; and a power supply circuit identification device configured to identify a type of the power supply circuit by functioning as:

a control section configured to input the control signal to the power supply circuit via the input terminal;

a reading section configured to read the detection signal from the output terminal; and an identification section configured to identify a type of the power supply circuit based on a reading result from the reading section, wherein:

the input terminal and the output terminal are provided in a same number as the electrical loads; and the control section inputs a different level of the control signal to the power supply circuit via at least one of the input terminals than that of the control signal input via other input terminals to identify the type of the power supply circuit.

11. The image output device according to claim 10, further comprising a switching section configured to switch between enabling and disabling of the identification section according to an external request.

12. A power supply circuit identification device for identifying a type of a power supply circuit that supplies electrical power to an electrical load, the power supply circuit having a first input terminal and a second input terminal to which control signals for controlling the electrical power supplied to the electrical load is input, at least one output terminal from which a detection signal is output, wherein the detection signal indicates whether the electrical power corresponding to the control signals input from the first input terminal and the second input terminal, respectively, is supplied to the electrical load, detection characteristics indicated by a higher level detection signal and a lower level detection signal for the control signals input via the first input terminal and the second input terminal, and inverted correlation with the detection characteristics between the first input terminal and the second input terminal, the power supply circuit identification device configured to function as:

a control section configured to input the control signal to the power supply circuit via the input terminal;

a reading section configured to read the detection signal from the output terminal;

an identification section configured to identify the type of the power supply circuit based on a reading result from the reading section; and a switching section configured to switch between enabling and disabling of the identification section according to an external request.

13. A power supply circuit identification method for identifying a type of a power supply circuit that supplies electrical power to an electrical load, the power supply circuit having an input terminal to which a control signal for controlling the electrical power supplied to the electrical load is input and an output terminal from which a detection signal is output, wherein the detection signal indicates whether the electrical power corresponding to the control signal input from the input terminal is supplied to the electrical load, at least one of the input terminal and output terminal being plurally provided and having a type-dependent correlation between the input and output terminals, the power supply circuit identification method comprising:

inputting a control signal to the power supply circuit via the input terminal;

reading a detection signal corresponding to the control signal;

identifying the type of the power supply circuit based on a reading result obtained in the reading step; and switching between enabling and disabling of the identifying step according to an external request.

14. A power supply circuit identification method for identifying a type of a power supply circuit that supplies electrical power to a plurality of electrical loads of a same kind, each of the plurality of electrical loads being provided for each of a plurality of colors for outputting an image, the power supply circuit having an input terminal to which a control signal for controlling the electrical power supplied to one or more of the electrical loads is input and an output terminal from which a detection signal is output, wherein the detection signal indicates whether the electrical power corresponding to the control signal input from the input terminal is supplied to the one or more of the electrical loads, at least one of the input terminal and output terminal being plurally provided and having a type-dependent correlation between the input and output terminals, the power supply circuit identification method comprising:

inputting a control signal to the power supply circuit via the input terminal;

reading a detection signal corresponding to the control signal; and identifying the type of the power supply circuit based on a reading result obtained in the reading step, wherein the input terminal and the output terminal are provided in a same number as the electrical loads, and wherein inputting the control signal includes inputting a different level of the control signal to the power supply circuit via at least one of the input terminals than that of the control signal input via other input terminals to identify the type of the power supply circuit.

15. A power supply circuit identification method for identifying a type of a power supply circuit that supplies electrical power to an electrical load, the power supply circuit having a first input terminal and a second input terminal to which control signals for controlling the electrical power supplied to the electrical load is input, at least one output terminal from which a detection signal is output, wherein the detection signal indicates whether the electrical power corresponding to the control signals input from the first input terminal and the second input terminal, respectively, is supplied to the electrical load, detection characteristics indicated by a higher level detection signal and a lower level detection signal for the control signals input via the first input terminal and the second input terminal, and inverted correlation with the detection characteristics between the first input terminal and the second input terminal, the power supply circuit identification method comprising:

inputting a control signal to the power supply circuit via at least one of the first input terminal and the second input terminal;

reading a detection signal corresponding to the control signal;

identifying a type of the power supply circuit based on a reading result obtained in the reading step; and switching between enabling and disabling of the identifying step according to an external request.

* * * * *